(12) United States Patent
Wang et al.

(10) Patent No.: US 11,570,527 B2
(45) Date of Patent: Jan. 31, 2023

(54) METHOD AND APPARATUS FOR RETRIEVING TELEPLAY CONTENT

(71) Applicant: BEIJING BAIDU NETCOM SCIENCE AND TECHNOLOGY CO., LTD., Beijing (CN)

(72) Inventors: Jianhua Wang, Beijing (CN); Jiajun Lu, Beijing (CN); Guangtao Liu, Beijing (CN); Dongxue Liu, Beijing (CN); Can Wang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 30 days.

(21) Appl. No.: 17/209,653

(22) Filed: Mar. 23, 2021

(65) Prior Publication Data
US 2021/0211784 A1 Jul. 8, 2021

(30) Foreign Application Priority Data

Apr. 10, 2020 (CN) .......................... 202010280565.5

(51) Int. Cl.
*H04N 21/8549* (2011.01)
*H04N 21/44* (2011.01)
(Continued)

(52) U.S. Cl.
CPC ... *H04N 21/8549* (2013.01); *H04N 21/44008* (2013.01); *H04N 21/4888* (2013.01); *H04N 21/8405* (2013.01); *H04N 21/8456* (2013.01)

(58) Field of Classification Search
CPC ............................... G11B 27/031; H04N 5/76
See application file for complete search history.

(56) References Cited

U.S. PATENT DOCUMENTS

| 8,842,965 | B1 * | 9/2014 | Song ........................ H04N 5/76 386/230 |
| 9,286,938 | B1 * | 3/2016 | Tseytlin ............... G11B 27/031 |

(Continued)

FOREIGN PATENT DOCUMENTS

| JP | 2000261754 A | 9/2000 |
| JP | 2006202253 A | 8/2006 |
| JP | 2009095013 A | 4/2009 |

OTHER PUBLICATIONS

Extended European Search Report issued in corresponding EP application 21164614.6 dated Aug. 13, 2021 (7 pages).
(Continued)

*Primary Examiner* — Sunghyoun Park
(74) *Attorney, Agent, or Firm* — Osha Bergman Watanabe & Burton LLP

(57) ABSTRACT

A method and an apparatus for retrieving teleplay content is disclosed. The method includes: generating basic summary information corresponding to each teleplay based on basic information of entities of each teleplay; generating episode summary information corresponding to each episode of each teleplay based on episode data of each episode of each teleplay; establishing a teleplay graph database based on the basic summary information corresponding to each teleplay and the episode summary information corresponding to each episode; and feeding a playing portal for a target episode of a target teleplay corresponding to teleplay search information back to a user based on the teleplay graph database.

14 Claims, 6 Drawing Sheets

(51) Int. Cl.
*H04N 21/488* (2011.01)
*H04N 21/8405* (2011.01)
*H04N 21/845* (2011.01)

(56) References Cited

U.S. PATENT DOCUMENTS

| | | | |
|---|---|---|---|
| 2015/0264093 A1* | 9/2015 | Madisch | G06Q 10/101 |
| | | | 715/753 |
| 2016/0104045 A1* | 4/2016 | Cho | G11B 27/28 |
| | | | 386/223 |
| 2016/0292510 A1* | 10/2016 | Han | G11B 27/06 |
| 2018/0068189 A1* | 3/2018 | Daliyot | H04N 5/91 |
| 2018/0160200 A1 | 6/2018 | Goel et al. | |
| 2018/0349368 A1* | 12/2018 | Bellingham | H04N 21/8456 |
| 2019/0236093 A1 | 8/2019 | Andavarapu et al. | |

OTHER PUBLICATIONS

Office Action issued in corresponding JP Application No. 2021-051621 with English translation dated Mar. 1, 2022 (10 pages).

\* cited by examiner

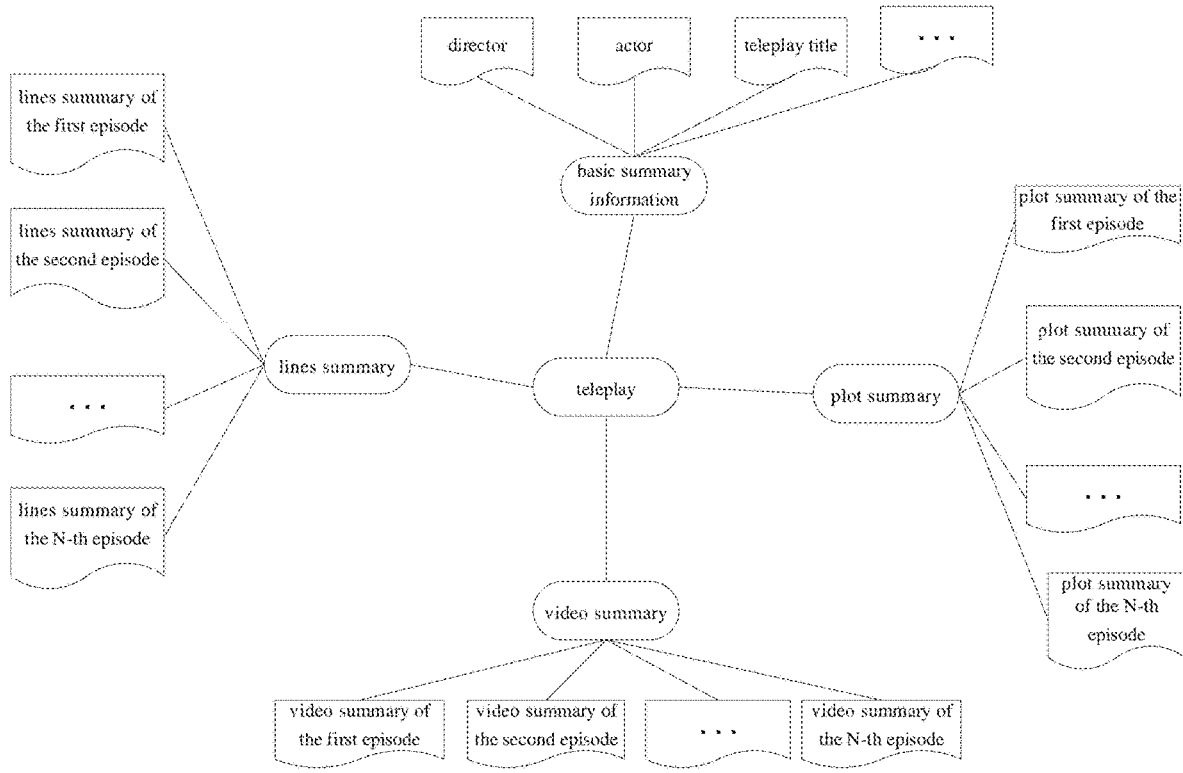

FIG. 6 parsing the teleplay search information inputted by the user, recognizing keywords matching a preset field, and determining a teleplay search type based on the keywords — 301 querying the summary type corresponding to each teleplay in the teleplay graph database, and determining a target summary type successfully matching the teleplay search type — 302 determining a target episode corresponding to a target summary description successfully matching the keywords based on a summary description corresponding to the target summary type preset in the teleplay graph database — 303 obtaining the playing portal corresponding to the target episode, and feeding the playing portal back to the user — 304

METHOD AND APPARATUS FOR RETRIEVING TELEPLAY CONTENT

CROSS-REFERENCE TO RELATED APPLICATION

The present application is based upon and claims priority to Chinese Patent Application No. 202010280565.5, filed on Apr. 10, 2020, the entire contents of which are incorporated herein by reference.

FIELD

The disclosure relates to a field of intelligent search technologies in a field of knowledge graph technologies, and particularly relates to a method and an apparatus for retrieving teleplay content.

BACKGROUND

With the rapid development of the Internet and the rise of 5G technology, more and more users shift from text consumption to teleplay consumption, and more and more users may browse a teleplay (or a film) anytime and anywhere. Presently, the teleplay is mainly concentrated in a video website. Meanwhile, a retrieval portal for the teleplay and its corresponding playing portal are provided by multiple search engines and information consumption platforms (for example, when "Story of Yanxi Palace" is inputted into a searching box of a search engine, a retrieval portal for the "Story of Yanxi Palace" and its corresponding playing portal are presented).

However, in the related art, a search service for matching the teleplay is provided for the user directly based on one or more keywords contained in a teleplay or news uploaded to the network, causing that the queried content by the user is either some text news or short videos uploaded by other users. In other words, as there are merely articles or fragments related to the teleplay, the user still may not get specific and complete teleplay resources which the user wants, thereby causing a poor user experience and an unsatisfied demand for retrieving teleplay content.

SUMMARY

According to a first aspect, a method for retrieving teleplay content is provided. The method includes: generating basic summary information corresponding to each teleplay based on basic information of entities of each teleplay; generating episode summary information corresponding to each episode of each teleplay based on episode data of each episode of each teleplay; establishing a teleplay graph database based on the basic summary information corresponding to each teleplay and the episode summary information corresponding to each episode; and feeding a playing portal for a target episode of a target teleplay corresponding to teleplay search information back to a user based on the teleplay graph database.

According to a second aspect, an apparatus for retrieving teleplay content is provided. The apparatus includes at least one processor and a memory communicatively coupled to the at least one processor. The at least one processor is configured to generate basic summary information corresponding to each teleplay based on basic information of entities of each teleplay; generate episode summary information corresponding to each episode of each teleplay based on episode data of each episode of each teleplay; establish a teleplay graph database based on the basic summary information corresponding to each teleplay and the episode summary information corresponding to each episode; and feed a playing portal for a target episode of a target teleplay corresponding to teleplay search information back to a user based on the teleplay graph database.

According to a third aspect, a non-transitory computer readable storage medium having computer instructions stored thereon is provided. The computer instructions are configured to cause a computer to execute a method for retrieving the teleplay content. The method includes: generating basic summary information corresponding to each teleplay based on basic information of entities of each teleplay; generating episode summary information corresponding to each episode of each teleplay based on episode data of each episode of each teleplay; establishing a teleplay graph database based on the basic summary information corresponding to each teleplay and the episode summary information corresponding to each episode; and feeding a playing portal for a target episode of a target teleplay corresponding to teleplay search information back to a user based on the teleplay graph database.

It should be understood that, content described in the Summary is not intended to identify key or important features of embodiments of the disclosure, but not used to limit the scope of the disclosure. Other features of the disclosure will become apparent from the following description.

BRIEF DESCRIPTION OF THE DRAWINGS

The accompanying drawings are used for better understanding the solution and do not constitute a limitation of the disclosure.

FIG. 6 is a block diagram illustrating a teleplay graph database according to Embodiment five of the disclosure.

FIG. 7 is a flow chart illustrating a method for retrieving teleplay content according to Embodiment six of the disclosure.

DETAILED DESCRIPTION

Description will be made below to exemplary embodiments of the disclosure with reference to accompanying drawings, which includes various details of embodiments of the disclosure to facilitate understanding and should be regarded as merely examples. Therefore, it should be recognized by the skilled in the art that various changes and modifications may be made to the embodiments described herein without departing from the scope and spirit of the disclosure. Meanwhile, for clarity and conciseness, descriptions for well-known functions and structures are omitted in the following description.

Figure 1:
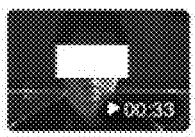
FIG. 1 is a schematic diagram illustrating a search result of a teleplay according to the related art.

As described in the above Background, a way for retrieving a teleplay provided for a user in the disclosure depends on one or more keywords of resources uploaded by other users or provided by platforms on the network, thereby causing a low search experience. For example, when the user inputs a search word "a mysterious smile of Hongfeng Guan", as illustrated in FIG. 1, either an article containing the search word "a mysterious smile of Hongfeng Guan" or a short video titled "a mysterious smile of Hongfeng Guan" may be fed back to the user, but a relevant complete teleplay may not be provided for the user. Therefore, there is a poor experience of the user for retrieving the teleplay.

Figure 2:
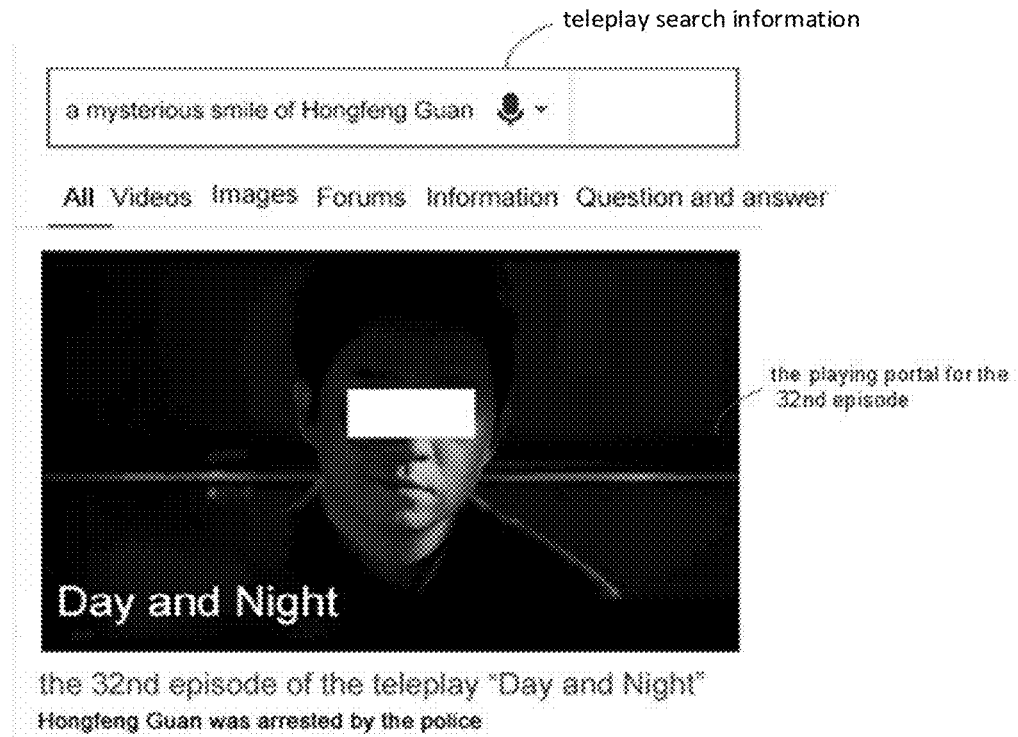
FIG. 2 is a schematic diagram illustrating a search result of a teleplay according to Embodiment one of the disclosure.

To solve the above technical problems, the disclosure provides a method for retrieving teleplay content. In this method, a corresponding teleplay may be fed back to the user based on one or more search words inputted by the user. For example, as illustrated in FIG. 2, after the user inputs the search word "a mysterious smile of Hongfeng Guan", a playing portal of the 32nd episode of the teleplay "Day and Night" may be directly provided for the user based on a refined analysis for the search word inputted by the user, and the user may quickly access and watch the corresponding episode of the teleplay based on the playing portal.

Description will be made below to a method for retrieving teleplay content according to embodiments of the disclosure with reference to detailed embodiments. For clear explanation, a title of a teleplay in embodiments is described as a real one of a teleplay, but it is only for explaining details of the technical solution of the disclosure, not for commercial use. Sensitive information in the accompanying drawings in embodiments is desensitized.

Figure 3:
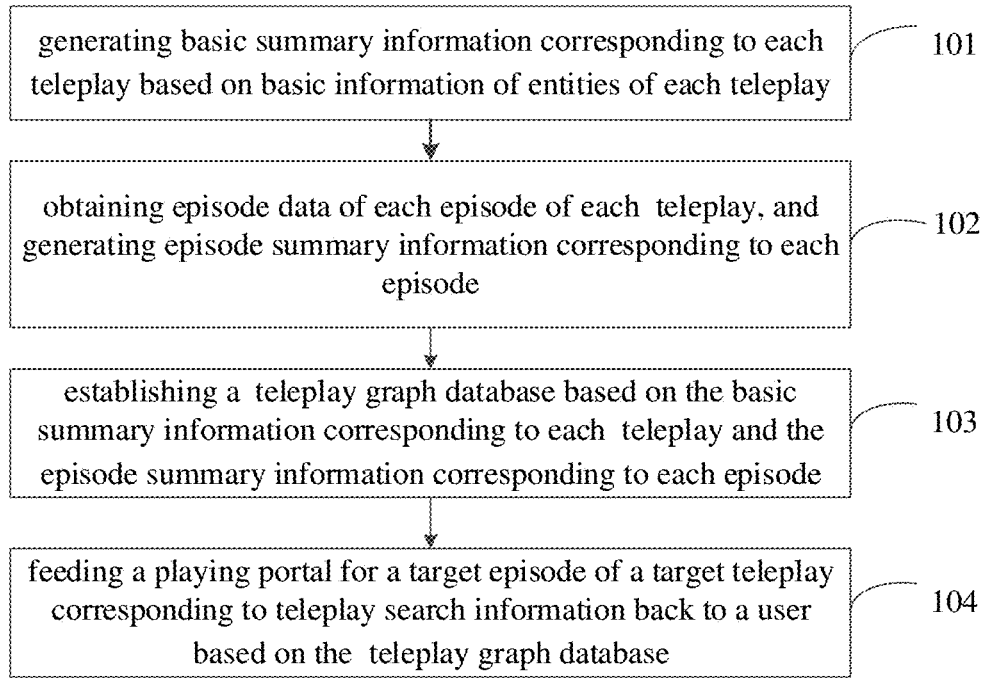
FIG. 3 is a flow chart illustrating a method for retrieving teleplay content according to Embodiment two of the disclosure.

In detail, FIG. 3 is a flow chart illustrating a method for retrieving teleplay content according to an embodiment of the disclosure. As illustrated in FIG. 3, the method includes the following blocks 101-104.

At block 101, basic summary information corresponding to each teleplay is generated based on basic information of entities of each teleplay.

The entity basic information includes a title, directors, names of participating staffs, names of actors, release time, etc. The entity basic information may be sorted out based on information provided by a producer of the teleplay. In this embodiment, the basic summary information corresponding to each teleplay is generated based on the entity basic information of the teleplay. The basic summary information may be in form of a list. As illustrated in Table 1, the list may include types of the entity basic information and content of the entity basic information. Of course, the basic summary information may also be in other forms, which is not listed here.

TABLE 1

| types of entity basic information | content of entity basic information |
|---|---|
| Title of the teleplay | Day and Night |
| Names of main actors | A, B |
| . . . | . . . |

At block 102, episode summary information corresponding to each episode of each teleplay is generated based on episode data of each episode of each teleplay.

In detail, the episode data corresponding to each episode of each teleplay is obtained, and the episode summary information corresponding to each episode of each teleplay is generated based on the episode data. The episode summary information includes any information of each episode different from other episodes of the teleplay. That is to say, in order to further understand the teleplay, the corresponding episode summary information is generated for each episode based on the episode data contained in the episode, such that a specific episode of the teleplay may be accurately positioned based on the episode summary information.

Main content of the episode data of each episode may be clearly sorted out based on the above episode summary information. As illustrated in Table 2, episode summary information below may be generated for the "Day and Night".

TABLE 2

| episodes | Lines summaries | video summaries | Plot summaries |
|---|---|---|---|
| the first episode of the teleplay "Day and Night" | I have to control the volume myself even when I fart. | The scar on Hongyu Guan's face is the same as one on Hongfeng Guan's face. The two brothers quarreled. There is a warrant on the phone. | A man in black is dismembered. Hongyu Guan is wanted by the Ministry of Public Security. Takeaway phone number: 17655 |
| . . . | I treat you as my brother, do you treat me as a cousin? | | |
| the 32nd episode of the teleplay "Day and Night" | Fifteen years went, Guan Lao, I, Xun Zhou, didn't even make you a friend, Be a man and walk on the road. Hit a ghost and step on a ghost road. It's time for me to make a trip to the evening | The fish in the aquarium is gone. Hongfeng Guan was handcuffed. Xun Zhou smoked and interrogated Hongfeng Guan. Hongfeng Guan smiled mysteriously | Xun Zhou was proved innocent. Everyone paid homage to Liu changyong . . . |

It should be noted that, the ways are different in different application scenes for obtaining the episode data corresponding to each episode of each teleplay and generating the episode summary information corresponding to each episode of each teleplay based on the episode data. Examples are as follows.

Example One

Figure 4:
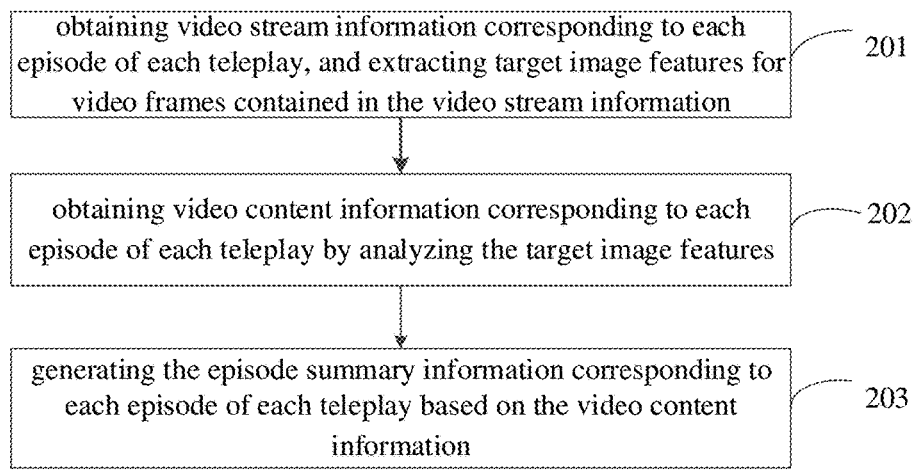
FIG. 4 is a flow chart illustrating a method for retrieving teleplay content according to Embodiment three of the disclosure.

In this example, as illustrated in FIG. 4, the above block 102 includes the following blocks 201-203.

At block 201, video stream information corresponding to each episode of each teleplay is obtained, and target image features for video frames contained in the video stream information are extracted.

In detail, in this embodiment, the target image features for the video frames is extracted from the video stream information. The target image feature may be various types of image features, such as a motion image feature, a color image feature, a facial feature of the user, an expression feature, and a mood feature.

As a possible implementation, each frame of the video frames contained in the video stream information may be inputted into a pre-constructed model, and the target image feature extracted by the model may be obtained.

Figure 5:
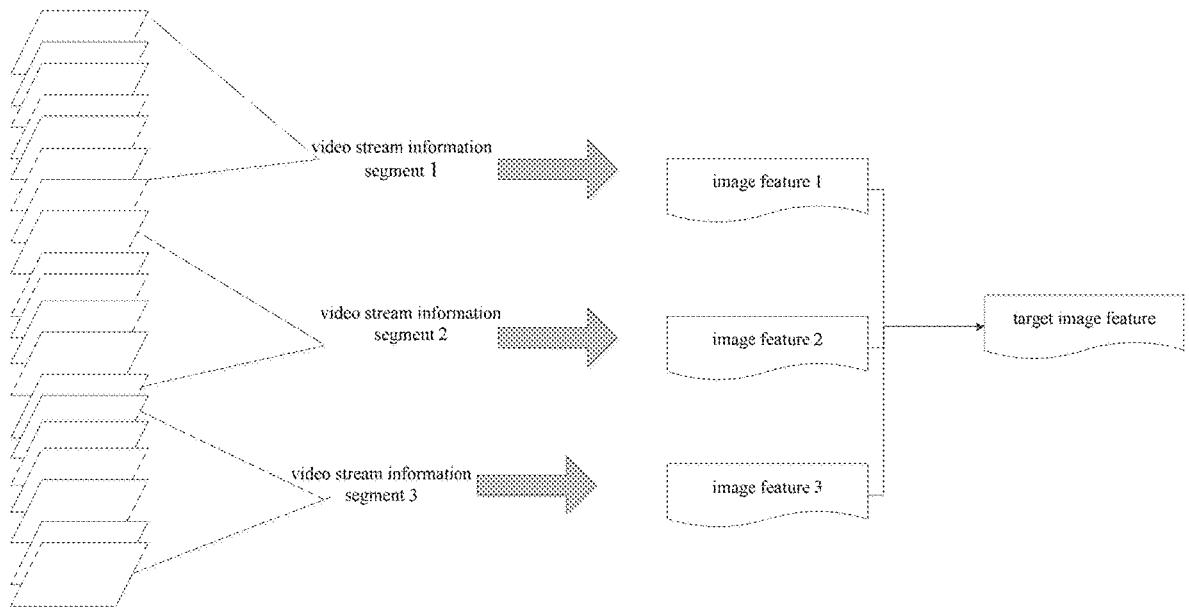
FIG. 5 is a schematic diagram illustrating a scene for determining a target image feature according to Embodiment four of the disclosure.

Of course, there may be a large number of video frames contained in the video stream information in some scenes. In order to reduce the amount of computation, as illustrated in FIG. 5, the video stream information may be divided into a plurality of video stream information segments. For example, the video stream information may be divided into a plurality of video stream information segments based on a fixed length. Then, candidate image features for all video frames contained in each video stream information segment are extracted from the plurality of video stream information segments, and all the candidate image features for all the video stream information segments are merged to generate the target image features for the video stream information.

At block 202, video content information corresponding to each episode of each teleplay is obtained by analyzing the target image features.

At block 203, the episode summary information corresponding to each episode of each teleplay is generated based on the video content information.

In detail, the target image feature is analyzed, and the video content information corresponding to each episode of each teleplay is obtained. For example, a neural network model is trained in advance, a corresponding target image feature is inputted into the neural network model trained in advance, and video content information corresponding to the target image feature may be obtained. The video content information may be action information, mood information, user's expression information, and the like. The episode summary information corresponding to each episode of each teleplay is generated based on the video content information, that is, keywords are extracted from the video content information, or the expression of sentences are optimized from the video content information to generate the episode summary information.

Example Two

In this example, a summary type may be obtained based on review information, bullet screen information and network public opinion information, to provide rich teleplay information for the user. In detail, review information, bullet screen information and network public opinion information corresponding to each episode of each teleplay may be obtained. The review information and the bullet screen information may be obtained from a corresponding platform. The network public opinion information may be obtained by matching one or more keywords on the Internet. Episode scoring information corresponding to each episode of each teleplay is generated based on the review information and the network public opinion information.

For example, the review information and the network public opinion information are analyzed to obtain an evaluation tendency, for example, whether the users like, dislike or really like the teleplay. Corresponding scoring information is determined based on the evaluation tendency, and then the episode scoring information is obtained. For example, the evaluation tendency, which is "the users really like the teleplay", is the highest score 5. Then, the episode comment content corresponding to each episode of each teleplay is generated based on the bullet screen information. For example, the episode comment content is generated based on a high-frequency vocabulary appearing in the bullet screen information. Finally, the episode summary information corresponding to each episode of each teleplay is generated based on the episode scoring information and the episode comment information. For example, the episode summary information of the 32nd episode of the teleplay "Day and Night" is that: the score is 5, and the users reflect that this episode is suspenseful and exciting.

At block 103, a teleplay graph database is established based on the basic summary information corresponding to each teleplay and the episode summary information corresponding to each episode.

In detail, the teleplay graph database is established based on the basic summary information corresponding to each teleplay and the episode summary information corresponding to each episode of each teleplay. The teleplay graph database comprehensively reflects teleplay information of each episode in the teleplay from a plurality of directions and dimensions.

As a possible embodiment, as illustrated in FIG. 6, when the episode summary information corresponding to the episode includes a lines summary, an episode summary and a video summary, a structure of the teleplay graph database may be as illustrated in FIG. 6, which comprehensively reflects information of N episodes of the teleplay.

At block 104, a playing portal for a target episode of a target teleplay corresponding to teleplay search information is fed back to a user based on the teleplay graph database.

In detail, after the teleplay graph database is constructed, the playing portal for the target episode of the target teleplay corresponding to the teleplay search information may be fed back to the user, thereby providing the user with a corresponding whole episode of a teleplay once. In some possible examples, a video frame which best matches the teleplay search information inputted by the user may be determined from the episodes of the teleplay based on the episode summary information, and the video frame may be taken as a cover of the target teleplay and displayed to the user.

Further, in some embodiments of the disclosure, the episode summary information includes a summary type and a summary description. The summary type may include the video summary, the lines summary, the plot summary, the episode summary, etc. The summary description is a summary of main information of the summary type. As illustrated in FIG. 7, feeding the playing portal for the target episode of the target teleplay corresponding to the teleplay search information back to the user based on the teleplay graph database includes the following blocks 301-304.

At block 301, the teleplay search information inputted by the user is parsed, keywords matching a preset field are recognized, and a teleplay search type is determined based on the keywords.

In detail, the teleplay search information inputted by the user is parsed. The teleplay search information may be a search word. Then the keywords matching the preset field are recognized. The preset field may be the words corresponding to teleplay search types, which may be an entity word field, an intention word field, a qualifier field, etc. In the actual execution procedure, segmentation processing may be performed on the teleplay search information to obtain a plurality of segments. The keywords matching the preset field may be determined based on attributes of the segments. Further, the corresponding teleplay search type may be determined based on the keywords. The teleplay search type may include one or more of: an actor search, a plot search, a video content search, a lines search, a comment search, a year search, etc.

For example, for the teleplay search information, the extracted keywords and the teleplay search type may be as illustrated in Table 3 below.

TABLE 3

| teleplay search information | Keywords | | | teleplay search types |
|---|---|---|---|---|
| | Entities | Intentions | Qualifiers | |
| A teleplay played by Yueming Pan and Longzheng Wang | Yueming Pan; Longzheng Wang | Teleplay | Teleplay | actor search |
| The demon queen talks to the ape | demon queen; ape | talk | | plot search |
| Hongfeng Guan smiled mysteriously | Hongfeng Guan | action | smile | video content search |
| ... | | | | ... |

At block 302, the summary type corresponding to each teleplay in the teleplay graph database is queried, and a target summary type successfully matching the teleplay search type is determined.

In detail, the summary type corresponding to each teleplay in the teleplay graph database is queried, and the target summary type successfully matching the teleplay search type is determined. That is, the matching is performed firstly based on the summary type.

At block 303, a target episode corresponding to a target summary description successfully matching the keywords is determined based on a summary description corresponding to the target summary type preset in the teleplay graph database.

In detail, the target episode corresponding to the target summary description successfully matching the keywords is determined based on the summary description corresponding to the target summary type preset in the teleplay graph database. The keyword matching may be achieved strictly based on a way of text matching, but also based on a way of semantic matching.

At block 304, the playing portal corresponding to the target episode is obtained, and the playing portal is fed back to the user.

In detail, after the playing portal corresponding to the target episode is matched, the playing portal corresponding to the target episode is fed back to the user. Therefore, the user may watch teleplay resources corresponding to a whole episode.

Figure 8:
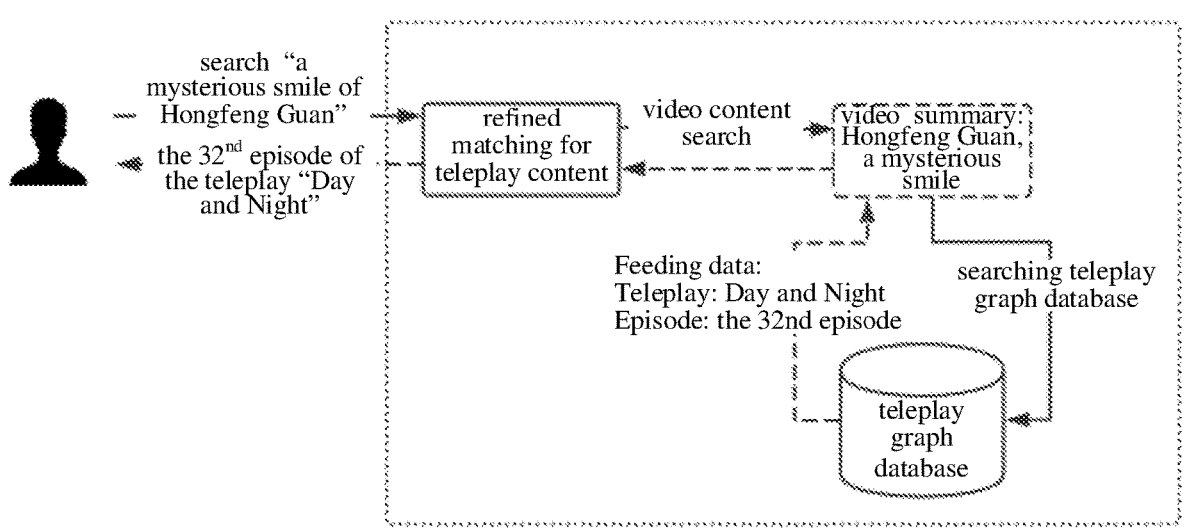
FIG. 8 is a flow chart illustrating a method for retrieving teleplay content according to Embodiment seven of the disclosure.

In order to enable the skilled in the art to understand the solution recited by the disclosure more clearly, description will be made below by taking a specific scene application as an example. As illustrated in FIG. 8, when the teleplay search information inputted by the user is "a mysterious smile of Hongfeng Guan", a teleplay search type corresponding to the teleplay search information is determined as "video content search" by extracting one or more keywords from the teleplay search information. The summary type (i.e., the "video content search") corresponding to each teleplay in the teleplay graph database is queried. The summary description in the teleplay graph database is matched to the target summary type "video content search". The teleplay summary of the 32nd episode of the "Day and Night" which describes "a mysterious smile of Hongfeng Guan" is obtained. Then the playing portal for the teleplay resources in the 32nd episode is fed back to the user.

In an embodiment of the disclosure, when the playing portal corresponding to the target episode is provided for the user, time period information of the video segment in the target episode may also be provided for the user, wherein the video segment contains the teleplay search information inputted by the user. For example, when the playing portal for the 32nd episode of the teleplay "Day and Night" is provided for the user, a piece of time period prompt information "a mysterious smile of Hongfeng Guan is located around the 30th minute and 40th second of the episode" may also be provided for the user.

In the actual execution procedure, it is determined as the target episode that episodes corresponding to target summary description for which a keyword matching degree is greater than a preset threshold, thereby obtaining a plurality of target episodes. Evaluation summary descriptions of the plurality of target episodes may further be obtained. The target episode with the highest score in the evaluation summary description may be fed back to the user.

In conclusion, with the method for retrieving the teleplay content, the entity basic information of teleplay entities is obtained. The basic summary information corresponding to each teleplay is generated based on the entity basic information of the teleplay entities. The episode data of each episode of each teleplay is obtained. The episode summary information corresponding to each episode is generated based on the episode data of each episode of each teleplay. Then, the teleplay graph database is established based on the basic summary information corresponding to each teleplay and the episode summary information corresponding to each episode. Finally, the playing portal for the target episode of the target teleplay corresponding to the teleplay search information is fed back to the user based on the teleplay graph database. In this way, a teleplay graph for comprehensively reflecting the teleplay content is created for the teleplay, and the whole episode of the teleplay matching the user demand may be searched for the user based on the teleplay graph, thereby improving a search experience of the user.

Figure 9:
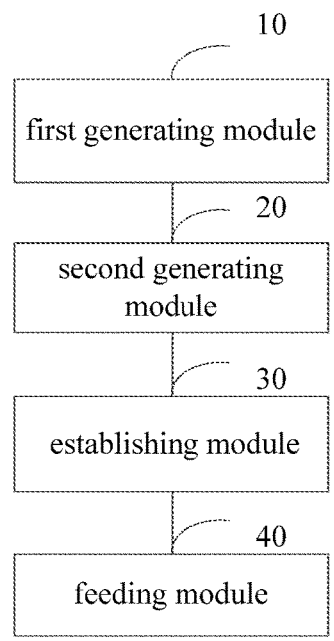
FIG. 9 is a block diagram illustrating an apparatus for retrieving teleplay content according to Embodiment eight of the disclosure.

To achieve the above embodiments, the disclosure also provides an apparatus for retrieving teleplay content. FIG. 9 is a block diagram illustrating an apparatus for retrieving teleplay content according to an embodiment of the disclosure. As illustrated in FIG. 9, the apparatus includes: a first generating module 10, a second generating module 20, an establishing module 30, and a feeding module 40.

The first generating module 10 is configured to generate basic summary information corresponding to each teleplay based on basic information of entities of each teleplay.

The second generating module 20 is configured to generate episode summary information corresponding to each episode of each teleplay based on episode data of each episode of each teleplay.

In some embodiments of the disclosure, the second generating module 20 is configured to: obtain video stream information corresponding to each episode of each teleplay, and extract target image features of video frames contained in the video stream information; obtain video content information corresponding to each episode of each teleplay by analyzing the target image features; and generate the episode summary information corresponding to each episode of each teleplay based on the video content information.

In some embodiments of the disclosure, the second generating module 20 is configured to: obtain review information, bullet screen information and network public opinion information corresponding to each episode of each teleplay; generate episode scoring information corresponding to each episode of each teleplay based on the review information and the network public opinion information; generate episode comment information corresponding to each episode of each teleplay based on the bullet screen information; and generate the episode summary information corresponding to each episode of each teleplay based on the episode scoring information and the episode comment information.

The establishing module 30 is configured to establish a teleplay graph database based on the basic summary information corresponding to each teleplay and the episode summary information corresponding to each episode.

The feeding module 40 is configured to feed a playing portal for a target episode of a target teleplay corresponding to teleplay search information back to a user based on the teleplay graph database.

In some embodiments of the disclosure, the feeding module 40 is configured to: parse the teleplay search information inputted by the user, recognize keywords matching a preset field, and determine a teleplay search type based on the keywords; query the summary type corresponding to each teleplay in the teleplay graph database, and determine a target summary type successfully matching the teleplay search type; determine a target episode corresponding to a target summary description successfully matching the keywords based on a summary description corresponding to the target summary type preset in the teleplay graph database; and obtain the playing portal corresponding to the target episode, and feed the playing portal back to the user.

It should be noted that, the above description of the method for retrieving the teleplay content is also applicable to the apparatus for retrieving the teleplay content in this embodiment, which has the same principle and is not elaborated herein.

In conclusion, with the apparatus for retrieving the teleplay content, the entity basic information of teleplay entities is obtained. The basic summary information corresponding to each teleplay is generated based on the entity basic information of the teleplay entities. The episode data of each episode of each teleplay is obtained. The episode summary information corresponding to each episode is generated based on the episode data of each episode of each teleplay. Then, the teleplay graph database is established based on the basic summary information corresponding to each teleplay and the episode summary information corresponding to each episode. Finally, the playing portal for the target episode of the target teleplay corresponding to the teleplay search information is fed back to the user based on the teleplay graph database. In this way, a teleplay graph for comprehensively reflecting the teleplay content is created for the teleplay, and the whole episode of the teleplay matching the user demand may be searched for the user based on the teleplay graph, thereby improving a search experience of the user.

According to embodiments of the disclosure, the disclosure also provides an electronic device and a readable storage medium.

Figure 10:
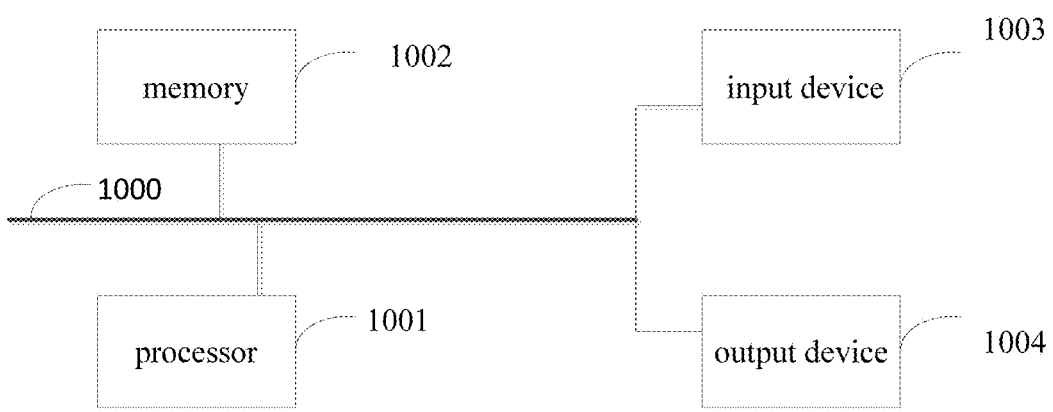
FIG. 10 is a block diagram illustrating an electronic device capable of implementing a method for retrieving teleplay content according to embodiments of the disclosure.

As illustrated in FIG. 10, FIG. 10 is a block diagram illustrating an electronic device capable of implementing a method for retrieving teleplay content according to embodiments of the disclosure. The electronic device aims to represent various forms of digital computers, such as a laptop computer, a desktop computer, a workstation, a personal digital assistant, a server, a blade server, a mainframe computer and other suitable computer. The electronic device may also represent various forms of mobile devices, such as personal digital processing, a cellular phone, a smart phone, a wearable device and other similar computing device. The components, connections and relationships of the components, and functions of the components illustrated herein are merely examples, and are not intended to limit the implementation of the disclosure described and/or claimed herein.

As illustrated in FIG. 10, the electronic device includes: one or more processors 1001, a memory 1002, and interfaces for connecting various components, including a high-speed interface and a low-speed interface. Various components are connected to each other via different buses, and may be mounted on a common main board or in other ways as required. The processor may process instructions executed within the electronic device, including instructions stored in or on the memory to display graphical information of the GUI (graphical user interface) on an external input/output device (such as a display device coupled to an interface). In other implementations, multiple processors and/or multiple buses may be used together with multiple memories if desired. Similarly, multiple electronic devices may be connected, and each device provides some necessary operations (for example, as a server array, a group of blade servers, or a multiprocessor system). In FIG. 10, a processor 1001 is taken as an example.

The memory 1002 is a non-transitory computer readable storage medium provided by the disclosure. The memory is configured to store instructions executable by at least one processor, to enable the at least one processor to execute the method for retrieving the teleplay content provided by the disclosure. The non-transitory computer readable storage medium provided by the disclosure is configured to store computer instructions. The computer instructions are configured to enable a computer to execute the method for retrieving the teleplay content provided by the disclosure.

As the non-transitory computer readable storage medium, the memory 1002 may be configured to store non-transitory software programs, non-transitory computer executable programs and modules, such as program instructions/module (such as the first generating module 10, the second generating module 20, the establishing module 30, and the feeding module 40 illustrated in FIG. 10) corresponding to the method for retrieving the teleplay content according to embodiments of the disclosure. The processor 1001 is configured to execute various functional applications and data processing of the server by operating non-transitory software programs, instructions and modules stored in the memory 1002, that is, implements the method for retrieving the teleplay content according to the above method embodiments.

The memory 1002 may include a storage program region and a storage data region. The storage program region may store an application required by an operating system and at least one function. The storage data region may store data created according to predicted usage of the electronic device based on the semantic representation. In addition, the memory 1002 may include a high-speed random access memory, and may also include a non-transitory memory, such as at least one disk memory device, a flash memory device, or other non-transitory solid-state memory device. In some embodiments, the memory 1002 may optionally include memories remotely located to the processor 1001, and these remote memories may be connected to the electronic device via a network. Examples of the above network include, but are not limited to, an Internet, an intranet, a local area network, a mobile communication network and combinations thereof.

The electronic device capable of implementing the method for retrieving the teleplay content may also include: an input device 1003 and an output device 1004. The processor 1001, the memory 1002, the input device 1003, and the output device 1004 may be connected via a bus or in other means. In FIG. 10, the bus is taken as an example.

The input device 1003 may receive inputted digital or character information, and generate key signal input related to user setting and function control of the electronic device capable of implementing the method for detecting the mobile traffic light, such as a touch screen, a keypad, a mouse, a track pad, a touch pad, an indicator stick, one or more mouse buttons, a trackball, a joystick and other input device. The output device 1004 may include a display device, an auxiliary lighting device (e.g., LED), a haptic feedback device (e.g., a vibration motor), and the like. The display device may include, but be not limited to, a liquid crystal display (LCD), a light emitting diode (LED) display, and a plasma display. In some embodiments, the display device may be the touch screen.

The various implementations of the system and technologies described herein may be implemented in a digital electronic circuit system, an integrated circuit system, an application specific ASIC (application specific integrated circuit), a computer hardware, a firmware, a software, and/or combinations thereof. These various implementations may include: being implemented in one or more computer programs. The one or more computer programs may be executed and/or interpreted on a programmable system including at least one programmable processor. The programmable processor may be a special purpose or general purpose programmable processor, may receive data and instructions from a storage system, at least one input device, and at least one output device, and may transmit data and the instructions to the storage system, the at least one input device, and the at least one output device.

These computing programs (also called programs, software, software applications, or codes) include machine instructions of programmable processors, and may be implemented by utilizing high-level procedures and/or object-oriented programming languages, and/or assembly/machine languages. As used herein, the terms "machine readable medium" and "computer readable medium" refer to any computer program product, device, and/or apparatus (such as, a magnetic disk, an optical disk, a memory, a programmable logic device (PLD)) for providing machine instructions and/or data to a programmable processor, including a machine readable medium that receives machine instructions as a machine readable signal. The term "machine readable signal" refers to any signal for providing the machine instructions and/or data to the programmable processor.

To provide interaction with a user, the system and technologies described herein may be implemented on a computer. The computer has a display device (such as, a CRT (cathode ray tube) or a LCD (liquid crystal display) monitor) for displaying information to the user, a keyboard and a pointing device (such as, a mouse or a trackball), through which the user may provide the input to the computer. Other types of devices may also be configured to provide interaction with the user. For example, the feedback provided to the user may be any form of sensory feedback (such as, visual feedback, auditory feedback, or tactile feedback), and the input from the user may be received in any form (including acoustic input, voice input or tactile input).

The system and technologies described herein may be implemented in a computing system including a background component (such as, a data server), a computing system including a middleware component (such as, an application server), or a computing system including a front-end component (such as, a user computer having a graphical user interface or a web browser through which the user may interact with embodiments of the system and technologies described herein), or a computing system including any combination of such background component, the middleware components and the front-end component. Components of the system may be connected to each other via digital data communication in any form or medium (such as, a communication network). Examples of the communication network include a local area network (LAN), a wide area networks (WAN), and the Internet.

The computer system may include a client and a server. The client and the server are generally remote from each other and generally interact via the communication network. A relationship between the client and the server is generated by computer programs operated on a corresponding computer and having a client-server relationship with each other.

It should be understood that, steps may be reordered, added or deleted by utilizing flows in the various forms illustrated above. For example, the steps described in the disclosure may be executed in parallel, sequentially or in different orders, so long as desired results of the technical solution disclosed in the disclosure may be achieved, there is no limitation here.

The above detailed implementations do not limit the protection scope of the disclosure. It should be understood by the skilled in the art that various modifications, combinations, sub-combinations and substitutions may be made based on design requirements and other factors. Any modification, equivalent substitution and improvement made within the spirit and the principle of the disclosure shall be included in the protection scope of disclosure.

What is claimed is:

1. A method for retrieving teleplay content, comprising:
   generating basic summary information corresponding to each teleplay based on basic information of entities of each teleplay;
   generating episode summary information corresponding to each episode of each teleplay based on episode data of each episode of each teleplay;
   establishing a teleplay graph database based on the basic summary information corresponding to each teleplay and the episode summary information corresponding to each episode; and feeding a playing portal for a target episode of a target teleplay corresponding to teleplay search information back to a user based on the teleplay graph database;

wherein generating the episode summary information corresponding to each episode of each teleplay comprises:

obtaining video stream information corresponding to each episode of each teleplay, and extracting target image features for video frames contained in the video stream information;

obtaining video content information corresponding to each episode of each teleplay by analyzing the target image features; and generating the episode summary information corresponding to each episode of each teleplay based on the video content information;

wherein extracting the target image features for video frames contained in the video stream information comprises:

dividing the video stream information into a plurality of video stream information segments;

extracting candidate image features for all video frames contained in each video stream information segment from the plurality of video stream information segments; and merging the candidate image features for all the video stream information segments to generate the target image features for the video stream information.

2. The method of claim 1, wherein generating the episode summary information corresponding to each episode of each teleplay based on the episode data of each episode of each teleplay comprises:

obtaining review information, bullet screen information and network public opinion information corresponding to each episode of each teleplay;

generating episode scoring information corresponding to each episode of each teleplay based on the review information and the network public opinion information;

generating episode comment information corresponding to each episode of each teleplay based on the bullet screen information; and generating the episode summary information corresponding to each episode of each teleplay based on the episode scoring information and the episode comment information.

3. The method of claim 1, wherein the episode summary information comprises a summary type and a summary description; and feeding the playing portal for the target episode of the target teleplay corresponding to the teleplay search information back to the user based on the teleplay graph database comprises:

parsing the teleplay search information inputted by the user, recognizing keywords matching a preset field, and determining a teleplay search type based on the keywords;

querying the summary type corresponding to each teleplay in the teleplay graph database, and determining a target summary type successfully matching the teleplay search type;

determining a target episode corresponding to a target summary description successfully matching the keywords based on a summary description corresponding to the target summary type preset in the teleplay graph database; and obtaining the playing portal corresponding to the target episode, and feeding the playing portal back to the user.

4. The method of claim 3, wherein recognizing keywords matching a preset field comprises:

performing segmentation processing on the teleplay search information to obtain a plurality of segments, and determining the keywords matching the preset field based on attributes of the plurality of segments.

5. The method of claim 1, further comprising:

feeding time information of a video frame in the target episode containing the teleplay search information to the user, and displaying the video frame as a cover of the target episode.

6. An apparatus for retrieving teleplay content, comprising:

at least one processor; and a memory, communicatively coupled to the at least one processor, wherein the at least one processor is configured to:

generate basic summary information corresponding to each teleplay based on basic information of entities of each teleplay;

generate episode summary information corresponding to each episode of each teleplay based on episode data of each episode of each teleplay;

establish a teleplay graph database based on the basic summary information corresponding to each teleplay and the episode summary information corresponding to each episode; and feed a playing portal for a target episode of a target teleplay corresponding to teleplay search information back to a user based on the teleplay graph database;

wherein the at least one processor is further configured to:

obtain video stream information corresponding to each episode of each teleplay, and extract target image features of video frames contained in the video stream information;

obtain video content information corresponding to each episode of each teleplay by analyzing the target image features; and generate the episode summary information corresponding to each episode of each teleplay based on the video content information;

wherein the at least one processor is further configured to:

divide the video stream information into a plurality of video stream information segments;

extract candidate image features for all video frames contained in each video stream information segment from the plurality of video stream information segments; and merge the candidate image features for all the video stream information segments to generate the target image features for the video stream information.

7. The apparatus of claim 6, wherein the at least one processor is further configured to:

obtain review information, bullet screen information and network public opinion information corresponding to each episode of each teleplay;

generate episode scoring information corresponding to each episode of each teleplay based on the review information and the network public opinion information;

generate episode comment information corresponding to each episode of each teleplay based on the bullet screen information; and generate the episode summary information corresponding to each episode of each teleplay based on the episode scoring information and the episode comment information.

8. The apparatus of claim 6, wherein the at least one processor is further configured to:
parse the teleplay search information inputted by the user, recognize keywords matching a preset field, and determine a teleplay search type based on the keywords;
query the summary type corresponding to each teleplay in the teleplay graph database, and determine a target summary type successfully matching the teleplay search type;
determine a target episode corresponding to a target summary description successfully matching the keywords based on a summary description corresponding to the target summary type preset in the teleplay graph database; and
obtain the playing portal corresponding to the target episode, and feed the playing portal back to the user.

9. The apparatus of claim 8, wherein the at least one processor is further configured to:
perform segmentation processing on the teleplay search information to obtain a plurality of segments, and
determine the keywords matching the preset field based on attributes of the plurality of segments.

10. The apparatus of claim 6, wherein the at least one processor is further configured to:
feed time information of a video frame in the target episode containing the teleplay search information to the user, and
display the video frame as a cover of the target episode.

11. A non-transitory computer readable storage medium having computer instructions stored thereon, wherein the computer instructions are configured to cause a computer to execute a method for retrieving teleplay content, the method comprising:
generating basic summary information corresponding to each teleplay based on basic information of entities of each teleplay;
generating episode summary information corresponding to each episode of each teleplay based on episode data of each episode of each teleplay;
establishing a teleplay graph database based on the basic summary information corresponding to each teleplay and the episode summary information corresponding to each episode; and
feeding a playing portal for a target episode of a target teleplay corresponding to teleplay search information back to a user based on the teleplay graph database;
wherein generating the episode summary information corresponding to each episode of each teleplay comprises:
obtaining video stream information corresponding to each episode of each teleplay, and extracting target image features for video frames contained in the video stream information;
obtaining video content information corresponding to each episode of each teleplay by analyzing the target image features; and
generating the episode summary information corresponding to each episode of each teleplay based on the video content information;
wherein extracting the target image features for video frames contained in the video stream information comprises:
dividing the video stream information into a plurality of video stream information segments;
extracting candidate image features for all video frames contained in each video stream information segment from the plurality of video stream information segments; and
merging the candidate image features for all the video stream information segments to generate the target image features for the video stream information.

12. The storage medium of claim 11, wherein generating the episode summary information corresponding to each episode of each teleplay based on the episode data of each episode of each teleplay comprises:
obtaining review information, bullet screen information and network public opinion information corresponding to each episode of each teleplay;
generating episode scoring information corresponding to each episode of each teleplay based on the review information and the network public opinion information;
generating episode comment information corresponding to each episode of each teleplay based on the bullet screen information; and
generating the episode summary information corresponding to each episode of each teleplay based on the episode scoring information and the episode comment information.

13. The storage medium of claim 11, wherein the episode summary information comprises a summary type and a summary description; and
feeding the playing portal for the target episode of the target teleplay corresponding to the teleplay search information back to the user based on the teleplay graph database comprises:
parsing the teleplay search information inputted by the user, recognizing keywords matching a preset field, and determining a teleplay search type based on the keywords;
querying the summary type corresponding to each teleplay in the teleplay graph database, and determining a target summary type successfully matching the teleplay search type;
determining a target episode corresponding to a target summary description successfully matching the keywords based on a summary description corresponding to the target summary type preset in the teleplay graph database; and
obtaining the playing portal corresponding to the target episode, and feeding the playing portal back to the user.

14. The storage medium of claim 11, further comprising:
feeding time information of a video frame in the target episode containing the teleplay search information to the user, and
displaying the video frame as a cover of the target episode.

* * * * *